United States Patent
Goyal et al.

(10) Patent No.: US 9,998,186 B2
(45) Date of Patent: Jun. 12, 2018

(54) MU-MIMO FOR POWERSAVE DEVICES

(71) Applicant: MediaTek Singapore Pte. Ltd., Singapore (SG)

(72) Inventors: Gagan Goyal, Uttar Pradesh (IN); Vinay Garg, Uttar Pradesh (IN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days. days.

(21) Appl. No.: 15/396,794

(22) Filed: Jan. 2, 2017

(65) Prior Publication Data

US 2017/0111092 A1 Apr. 20, 2017

(51) Int. Cl.
*H04B 7/04* (2017.01)
*H04B 7/0452* (2017.01)
*H04W 52/02* (2009.01)

(52) U.S. Cl.
CPC ...... *H04B 7/0452* (2013.01); *H04W 52/0229* (2013.01); *Y02B 60/50* (2013.01); *Y02D 70/00* (2018.01)

(58) Field of Classification Search
CPC . H04B 7/0452; H04W 52/0229; Y02B 60/50; Y02D 70/00
See application file for complete search history.

(56) References Cited

U.S. PATENT DOCUMENTS

| | | | | |
|---|---|---|---|---|
| 2013/0064166 | A1* | 3/2013 | Calcev | H04W 4/08 370/312 |
| 2014/0050178 | A1* | 2/2014 | Asai | H04W 8/186 370/329 |
| 2014/0307602 | A1* | 10/2014 | Seok | H04W 52/0216 370/311 |
| 2015/0124690 | A1* | 5/2015 | Merlin | H04L 5/0055 370/312 |
| 2016/0150434 | A1* | 5/2016 | Abinader, Jr. | H04W 4/00 455/67.11 |
| 2016/0165625 | A1* | 6/2016 | Seok | H04B 7/0452 370/311 |
| 2016/0301452 | A1* | 10/2016 | Kwon | H04B 7/0421 |

* cited by examiner

*Primary Examiner* — Syed Haider
(74) *Attorney, Agent, or Firm* — Han IP Corporation; Andy M. Han

(57) ABSTRACT

A method and an apparatus pertaining to improved multi-user multiple-input and multiple-output (MU-MIMO) communications and power saving for a set of wireless communication devices may involve transmitting a beacon frame to the set of wireless communication devices, with the beacon frame indicating a group identifier associated with a group of wireless communication devices of the set of wireless communication devices, where one or more wireless communication device associated with group is/are in power-save. An announcement frame may also be transmitted to the set of wireless communication devices, with the announcement frame indicating buffered packet to one or more wireless communication devices of the group of wireless communication devices associated with the group identifier. A response may be received from one or more wireless communication devices. A MIMO data packet may be transmitted to one or more wireless communication device in response to the receiving of the response.

18 Claims, 7 Drawing Sheets

EXAMPLE MULTI-USER TRAFFIC INDICATION MAP INFORMATION ELEMENT (MU TIM IE)

| ELEMENT ID (EID) | LENGTH | GROUP ID (GID) |
|---|---|---|
| 1 | 1 | 1 |

EXAMPLE LENGTH (OCTETS)

FIG. 1

MU-MIMO FOR POWERSAVE DEVICES

TECHNICAL FIELD

The present disclosure is generally related to wireless communications and, more particularly, to improved multi-user multiple-input and multiple-output (MU-MIMO) communications and power saving for wireless communication devices.

BACKGROUND

Unless otherwise indicated herein, approaches described in this section are not prior art to the claims listed below and are not admitted to be prior art by inclusion in this section.

Presently there is no approach defined in the Institute of Electrical and Electronics Engineers (IEEE) 802.11ac specifications for multi-user multiple-input and multiple-output (MU-MIMO) technologies for powersave devices. However, for MU-MIMO, all wireless devices capable of multi-user (MU) communications need to be in an awake mode so that an access point (AP) may send them MU physical layer convergence procedure (PLOP) protocol data units (PPDU). Moreover, it is possible that antenna matrix may change over time due to movement of powersave devices, such as mobile phones and wireless speakers for example, and as a result the powersave devices may not be able to receive beamformed data packets.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose a novel scheme for improved MU-MIMO communications and power saving for wireless communication devices that can function as powersave devices. The proposed scheme enables an access point to indicate to a set of powersave capable wireless communication devices which powersave capable wireless communication devices among the set of powersave capable wireless communication devices should remain awake to receive data packets. Advantageously, those other powersave capable wireless communication devices among the set of powersave capable wireless, to which the access point has no data packets to transmit, can be in a sleep mode to reduce power consumption. It is noteworthy that, although examples described herein may be in the context of wireless communications in accordance with the IEEE 802.11 specifications, the proposed scheme of the present disclosure may be implemented in wireless communications in accordance with other technologies where applicable.

In one aspect, a method may involve transmitting a beacon frame to a set of wireless communication devices, with the beacon frame indicating a group identifier associated with a group of wireless communication devices of the set of wireless communication devices. The method may also involve transmitting an announcement frame to the set of wireless communication devices, with the announcement frame indicating one or more wireless communication devices of the group of wireless communication devices associated with the group identifier. The method may further involve receiving a response containing VHT compressed beamforming feedback matrix from one or more wireless communication devices associated with the Group identifier indicated in beacon. The method may additionally involve transmitting a MIMO data packet to one or more wireless communication devices responsive to the receiving of the response.

In another aspect, a method may involve receiving a beacon frame from an access point, with the beacon frame indicating a group identifier associated with a group of wireless communication devices of a set of wireless communication devices. The method may also involve receiving an announcement frame, with the announcement frame indicating one or more wireless communication devices of the group of wireless communication devices associated with the group identifier. The method may further involve transmitting a response to the access point. The method may additionally involve receiving a MIMO data packet from the access point responsive to the transmitting of the response.

In yet another aspect, an apparatus may include a memory and a processor. The memory may be configured to store one or more sets of instructions. The processor may be coupled to access the memory to execute the one or more instructions and, upon executing the one or more sets of instructions, the processor may perform a number of operations including: (1) transmitting a beacon frame to a set of wireless communication devices, with the beacon frame indicating a group identifier associated to one or more wireless communication devices of the set of wireless communication devices; (2) transmitting an announcement frame to the set of wireless communication devices, with the announcement frame indicating one or more wireless communication devices associated with the group identifier; (3) receiving a response containing VHT compressed beamforming feedback matrix from one or more wireless communication device(s); and (4) transmitting a multiple-input-and-multiple-output (MIMO) data packet to one or more wireless communication device(s) responsive to the receiving of the response.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 1 is a diagram of an example information element in accordance with an implementation of the present disclosure.

DETAILED DESCRIPTION OF PREFERRED IMPLEMENTATIONS

Figure 2:
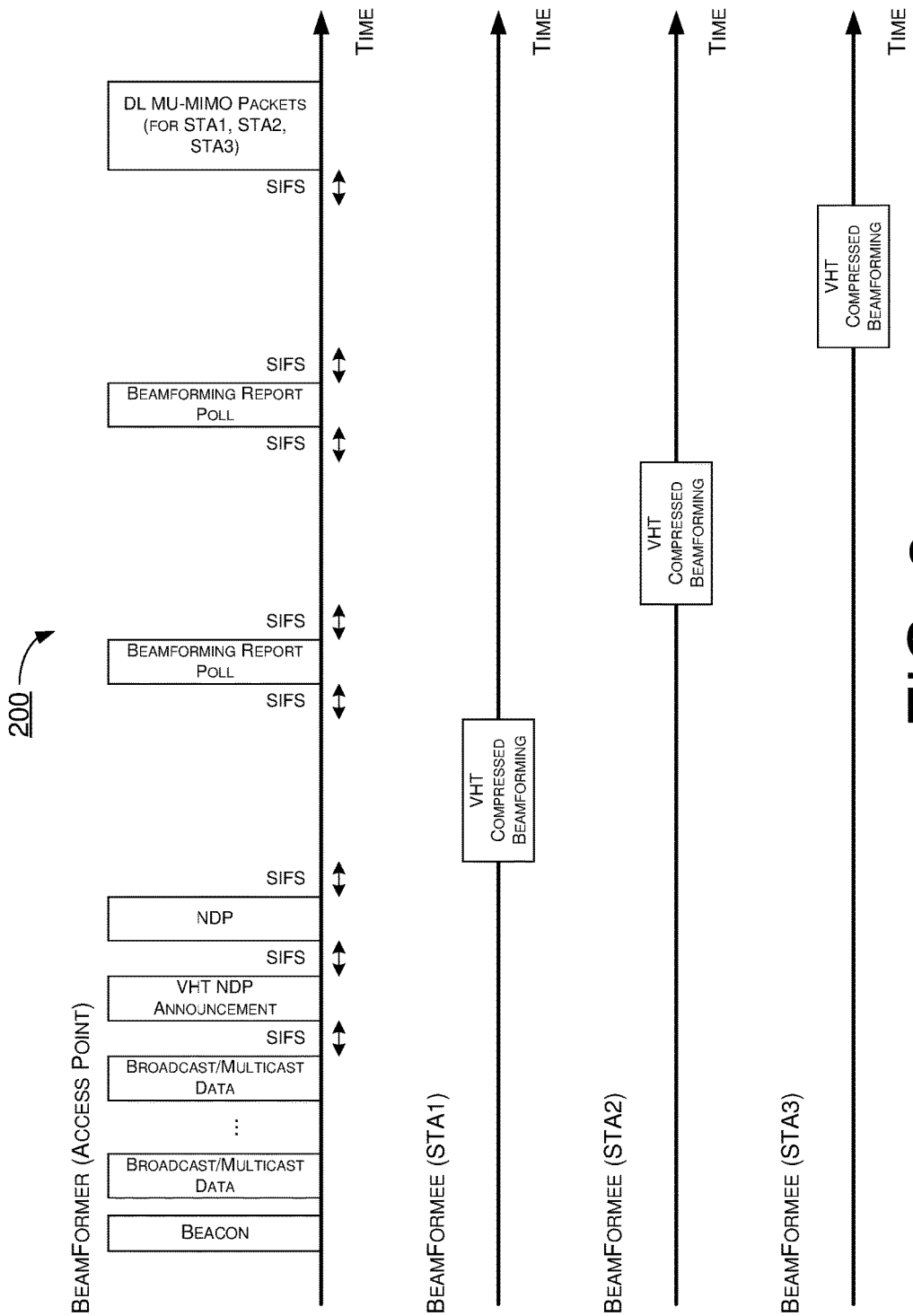
FIG. 2 is a diagram of an example scenario in accordance with an implementation of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

In various implementations of the proposed scheme of the present disclosure, a novel multi-user (MU) traffic indication map (TIM) information element (IE), or MU TIM IE, may be utilized by an access point to indicate a select group containing one or more powersave capable wireless communication device(s) among a set of powersave capable wireless communication devices. In the context of wireless communications in accordance with IEEE 802.11, the set of powersave capable wireless communication devices may include a set of MU-MIMO-capable mobile clients or Wi-Fi stations (STAs) in a service set associated with the access point. In some cases, under the proposed scheme, each wireless communication device in the group may need to stay in an awake mode to receive further information and/or data packets from the access point. Alternatively, one or all of the wireless communication devices in the group may need to stay in an awake mode to receive further information and/or data packets from the access point, while other wireless communication devices in the group may enter into a sleep mode to conserve power.

FIG. 1 illustrates an example MU TIM IE 100 in accordance with an implementation of the present disclosure. Referring to FIG. 1, MU TIM IE 100 may include an element identifier (ID) field (EID), a length field and a group ID (GID) field. Each of the EID field, length field and GID field may have a length of 1 byte or 8 bits. Alternatively, each of the EID field, length field and GID field may have a length different than 1 byte. The GID field may contain a value corresponding to a group ID, as a way to indicate one group out of one or more groups containing one or more powersave capable wireless communication devices among a set of powersave capable wireless communication devices. In some implementations, the group of wireless communication devices as indicated in the GID field may include one or more powersave-capable wireless communication devices for which one or more medium access control (MAC) service data units (MSDUs) and/or one or more MAC management protocol data units (MMPDUs) may be buffered at the access point.

Under the proposed scheme, MU TIM IE 100, or any variations or derivatives thereof, may be included in a beacon frame such as, for example and without limitation, a delivery traffic indication map (DTIM) beacon frame. In some implementations, the access point may transmit a null data packet announcement (NDPA) frame after transmitting the DTIM beacon frame, followed by one or more MIMO data packets upon receiving feedback matrix from at least one wireless communication device of the group of wireless communication devices among the set of wireless communication devices in the service set.

Under the proposed scheme, the access point may check powersave queues for the set of wireless communication devices, and select the group of wireless communication devices based on data priority based on a result of the checking. The access point may then generate the beacon frame (e.g., DTIM beacon frame) which includes a MU TIM IE (e.g., MU TIM IE 100) having a GID field that indicates a group identifier identifying the selected group of wireless communication devices among the set of wireless communication devices in the service set.

Under the proposed scheme, the access point may also prepare a announce frame (e.g., NDPA frame). The announcement frame may contain a station information field indicating one or more wireless communication devices in the group of wireless communication devices for which data packets are available. Under the proposed scheme, this may be used as a mechanism for the access point to communicate with or otherwise indicate to the group of wireless communication devices which one(s) of the wireless communication devices in the group is/are free to enter into a sleep mode, since there are no data packets for them, to reduce power consumption. The announcement frame may be transmitted by the access point after the beacon frame is transmitted.

Under the proposed scheme, in an event that a DTIM bit and GID are set at the same time, priority may be given to broadcast and/or multicast frames associated with the beacon frame (e.g., DTIM beacon frame). In such cases, the announcement frame (e.g., NDPA frame) may be transmitted by the access point immediately after one or more broadcast and/or multicast frame(s) is/are transmitted.

Under the proposed scheme, the access point may transmit MIMO data packets after receiving feedback matrix (e.g., response) from one or more of the wireless communication devices in the group.

Under the proposed scheme, each wireless communication device in the service set may be associated with one or more GID(s). For instance, two or more wireless communication devices in the service set may be associated with one GID while one or more other wireless communication devices in the service set may be associated with another GID, and there may be more than one GID associated with all the wireless communication devices in the service set. Moreover, each wireless communication device in the service set is associated with a respective association ID (AID) different from that of other wireless communication devices in the service set.

Under the proposed scheme, the wireless communication devices, which are MU-MIMO mobile clients or stations, may be capable of identifying the MU TIM IE (e.g., MU TIM IE 100) in the beacon frame (e.g., DTIM beacon frame). Moreover, the wireless communication devices may wake up (e.g., enter into an awake mode from a sleep mode) to receive the beacon frame from the access point. Additionally, those wireless communication devices with a respective GID that is indicated in the MU TIM IE may remain awake (e.g., remain in the awake mode) to receive the announcement frame (e.g., NDPA frame). Furthermore, each wireless communication device with a respective AID not present in the station information field in the announcement frame may be free to enter into a sleep mode immediately, since there are no data packets for them, to reduce power consumption.

FIG. 2 illustrates an example scenario 200 in accordance with an implementation of the present disclosure. Scenario 200 may involve MU-MIMO communications between an access point (denoted in FIG. 2 and herein interchangeably referred as "beamformer") and a number of wireless communication devices or stations, namely STA1, STA2 and STA3 (denoted in FIG. 2 and herein interchangeably referred as "beamformee 1", "beamformee 2" and "beamformee 3", respectively). Scenario 200 may be an example illustration of a situation in which each station in an advertised group listens to a beacon from the access point.

Referring to FIG. 2, beamformer may first transmit a beacon frame (e.g., DTIM beacon frame) followed by one or more broadcast and/or multicast data frames. After a time interval of a short interframe space (SIFS) of transmitting the one or more broadcast and/or multicast data frames, beamformer may transmit a very high throughput (VHT) null data packet (NDP) announcement (NDPA) frame, followed by a NDP at a SIFS after the transmission of the NDPA frame. After a SIFS from transmitting the NDP, beamformer may receive a VHT compressed beamforming response from beamformee 1. After a SIFS from receiving the response from beamformee 1, beamformer may transmit a beamforming report poll. After a SIFS, beamformer may receive a VHT compressed beamforming response from beamformee 2. After a SIFS from receiving the response from beamformee 2, beamformer may transmit another beamforming report poll. After a SIFS, beamformer may receive a VHT compressed beamforming response from beamformee 3. After a SIFS from receiving the response from beamformee 3, beamformer may transmit downlink (DL) MU-MIMO data packets to STA1 (beamformee 1), STA2 (beamformee 2) and STA3 (beamformee 3).

Under the proposed scheme, the beamformer expects response containing VHT compressed beamforming feedback from each station, whose information was provided in the VHT NDPA frame. It is possible that even a first station among a number of stations (whose AID was present in very first station information field in the VHT NDPA frame) does not send the response. In such cases the beamformer may send a beamforming report poll frame to a next station after a packet interframe space (PIFS) interval to obtain the compressed beamforming feedback matrix.

Figure 3:
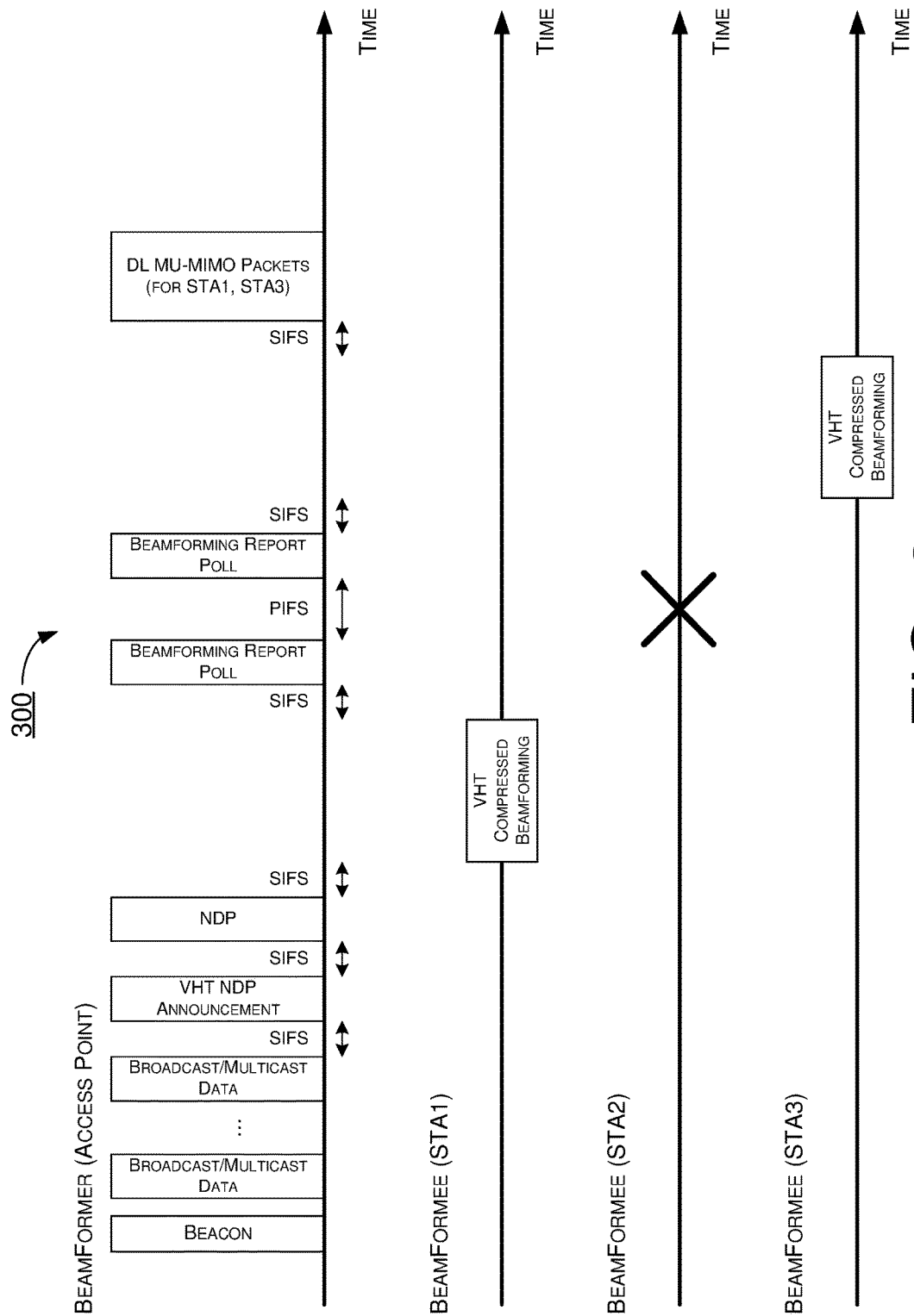
FIG. 3 is a diagram of an example scenario in accordance with another implementation of the present disclosure.

FIG. 3 illustrates an example scenario 300 in accordance with another implementation of the present disclosure. Scenario 300 may involve MU-MIMO communications between an access point (denoted in FIG. 3 and herein interchangeably referred as "beamformer") and a number of wireless communication devices or stations, namely STA1, STA2 and STA3 (denoted in FIG. 3 and herein interchangeably referred as "beamformee 1", "beamformee 2" and "beamformee 3", respectively). Scenario 300 may be an example illustration of a situation in which one or more stations in an advertised group does/do not listen to a beacon from the access point.

Referring to FIG. 3, beamformer may first transmit a beacon frame (e.g., DTIM beacon frame) followed by one or more broadcast and/or multicast data frames. After a time interval of a SIFS of transmitting the one or more broadcast and/or multicast data frames, beamformer may transmit a VHT NDPA frame, followed by a NDP at a SIFS after the transmission of the NDPA frame. After a SIFS from transmitting the NDP, beamformer may receive a VHT compressed beamforming response from beamformee 1. After a SIFS from receiving the response from beamformee 1, beamformer may transmit a beamforming report poll. After a PIFS and without receiving any response from beamformee 2, beamformer may transmit another beamforming report poll. After a SIFS, beamformer may receive a VHT compressed beamforming response from beamformee 3. After a SIFS from receiving the response from beamformee 3, beamformer may transmit DL MU-MIMO data packets to STA1 (beamformee 1) and STA3 (beamformee 3) without transmitting any data packet to STA2 (beamformee 2).

In scenario 300, the retry limit for beamformer to transmit a beamforming report poll is 0. In other implementations, the retry limit may be any number other than 0. In some implementations, beamformer may transmit the beamforming report poll for a next beamformee after a PIFS interval if no compressed beamforming packet, as a response, is received from a current beamformee from which beamformer expects to receive the response if the current beamformee is awake.

In scenario 300, beamformer may consider or otherwise assume beamformee 2 to be in a sleep mode as no VHT compressed beamforming feedback packet, as a response, is received from beamformee 2 in response to the beamforming report poll. Accordingly, beamformer may refrain from sending or otherwise transmitting data packets to beamformee 2 (and any beamformee considered being in the sleep mode as a result of having no response received therefrom). Conversely, beamformer may consider or otherwise assume a beamformee to be in an active state or awake mode, and hence able to receive data packets, as a result of beamformer receiving a response (e.g., VHT compressed beamforming feedback packet) from such beamformee.

Figure 4:
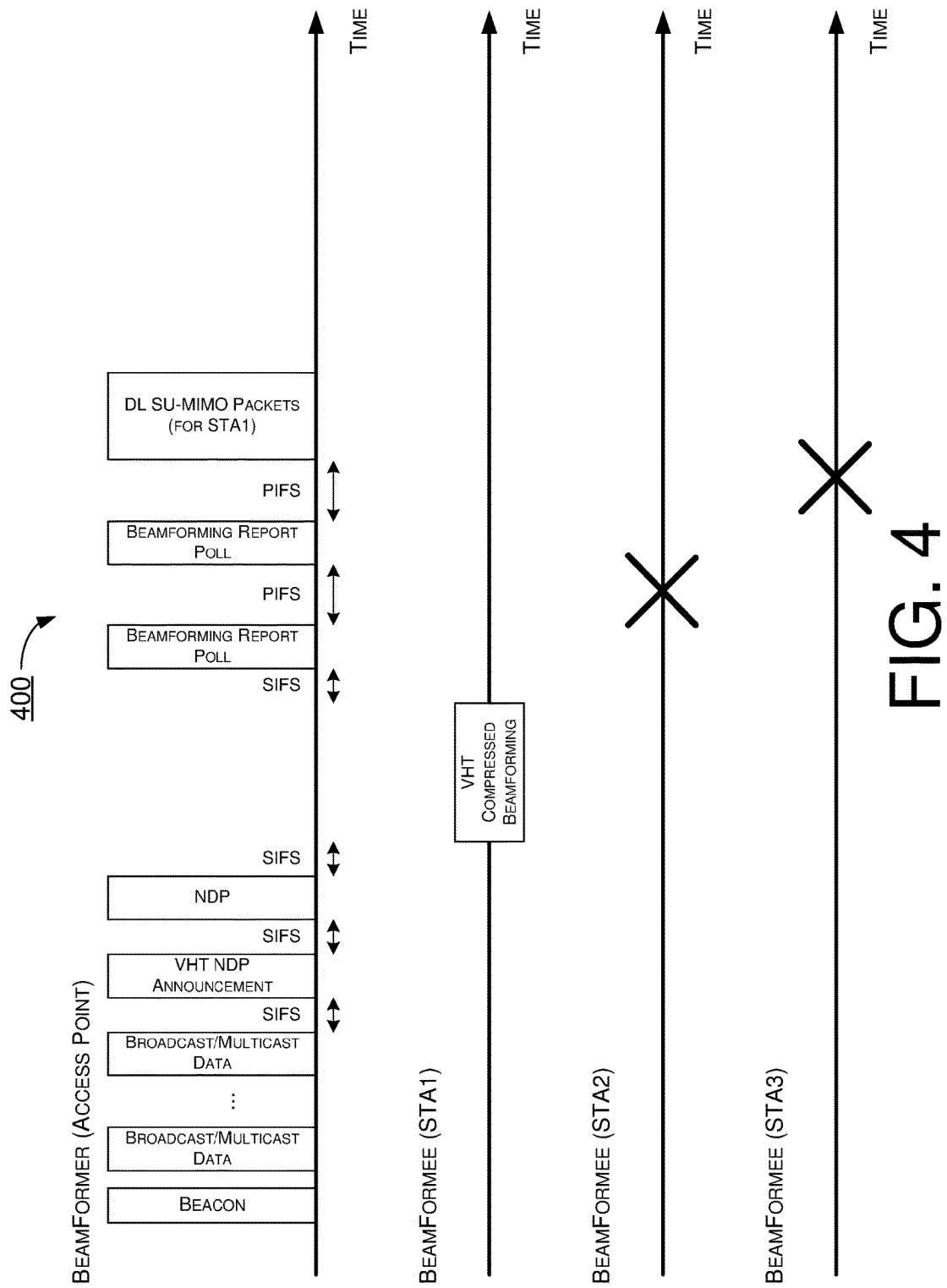
FIG. 4 is a diagram of an example scenario in accordance with another implementation of the present disclosure.

FIG. 4 illustrates an example scenario 400 in accordance with another implementation of the present disclosure. Scenario 400 may involve MU-MIMO communications between an access point (denoted in FIG. 4 and herein interchangeably referred as "beamformer") and a number of wireless communication devices or stations, namely STA1, STA2 and STA3 (denoted in FIG. 4 and herein interchangeably referred as "beamformee 1", "beamformee 2" and "beamformee 3", respectively). Scenario 400 may be an example illustration of a situation in which only one station in an advertised group is in an active state (e.g., being in the awake mode).

Referring to FIG. 4, beamformer may first transmit a beacon frame (e.g., DTIM beacon frame) followed by one or more broadcast and/or multicast data frames. After a time interval of a SIFS of transmitting the one or more broadcast and/or multicast data frames, beamformer may transmit a VHT NDPA frame, followed by a NDP at a SIFS after the transmission of the NDPA frame. After a SIFS from transmitting the NDP, beamformer may receive a VHT compressed beamforming response from beamformee 1. After a SIFS from receiving the response from beamformee 1, beamformer may transmit a beamforming report poll. After a PIFS and without receiving any response from beamformee 2, beamformer may transmit another beamforming report poll. After a PIFS and without receiving any response from beamformee 3, beamformer may transmit DL MU-MIMO data packets to STA1 (beamformee 1) without transmitting any data packet to STA2 (beamformee 2) or STA3 (beamformee 3).

In scenario 400, as there is only STA1 (beamformee 1) listening to beamformer, beamformer may transmit one or more single-user (SU) MIMO (SU-MIMO) data packets to STA1, as STA1 is the sole active station in the group whose respective GID is advertised in the beacon frame and whose respective AID is advertised in the NDPA frame.

Illustrative Implementations

Figure 5:
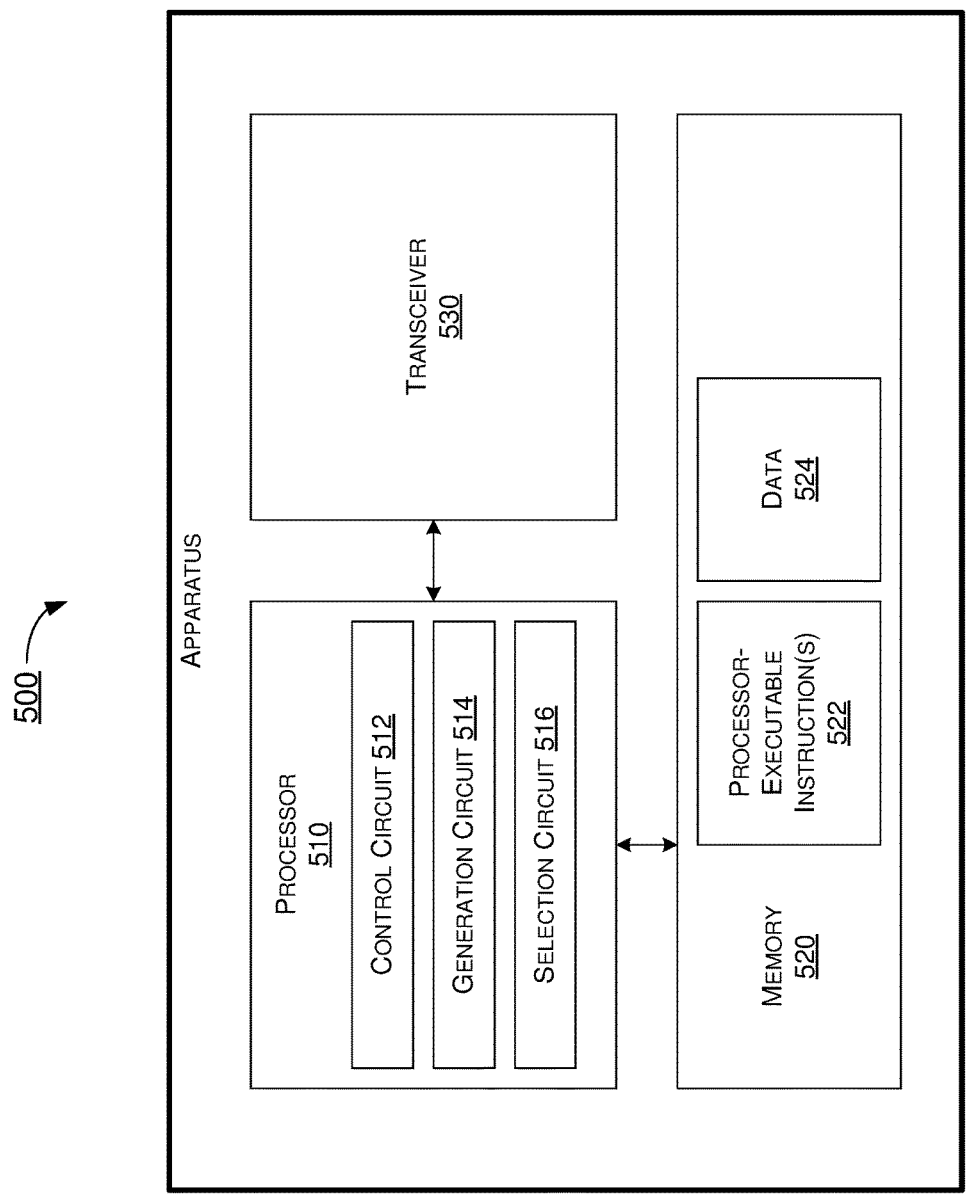
FIG. 5 is a block diagram of an example apparatus in accordance with an implementation of the present disclosure.

FIG. 5 illustrates an example apparatus 500 in accordance with an implementation of the present disclosure. Apparatus 500 may perform various functions to implement schemes, techniques, processes and methods described herein pertaining to improved MU-MIMO for powersave devices, including scenario 200, scenario 300 and scenario 400 described above as well as process 600 and process 700 described below. Apparatus 500 may be a part of an electronic apparatus which may be a communication device, a computing apparatus, a portable or mobile apparatus, or a wearable apparatus. For instance, apparatus 500 may be implemented in a repeater, a Wi-Fi access point, a Wi-Fi mobile client or station, a smartphone, a smartwatch, a smart bracelet, a smart necklace, a personal digital assistant, or a computing device such as a tablet computer, a laptop computer, a notebook computer, a desktop computer, or a server. Alternatively, apparatus 500 may be implemented in the form of one or more integrated-circuit (IC) chips such as, for example and not limited to, one or more single-core processors, one or more multi-core processors, or one or more complex-instruction-set-computing (CISC) processors. Apparatus 500 may include at least some of those components shown in FIG. 5, such as a processor 510 and a memory 520. Additionally, apparatus 500 may include a transceiver 530 configured to transmit and receive data wirelessly (e.g., in compliance with the IEEE 802.11 specification and/or any applicable wireless protocols and standards). Apparatus 500 may further include other components (e.g., power system, display device and user interface device), which are not pertinent to the proposed scheme of the present disclosure and, thus, are neither shown in FIG. 5 nor described herein in the interest of simplicity and brevity.

Transceiver 530 may be configured to communicate wirelessly in 5 GHz band or multiple frequency band (2.4 GHz and 5 GHz both). Moreover, transceiver 530 may function as a host or access point in 5 GHz band (in cases of single-band communication) or more frequency bands (in cases of dual-band or multi-band communication). Alternatively or additionally, transceiver 530 may function as a client or station in 5 GHz band (in cases of single-band communication) or more frequency bands (in cases of dual-band or multi-band communication).

Memory 520 may be a storage device configured to store one or more sets of codes, programs and/or instructions 522 as well as data 524 therein. For example, memory 520 may be operatively coupled to processor 510 to receive data 524, such as data packets and/or MU TIM IE, to store therein. Memory 520 may be implemented by any suitable technology and may include volatile memory and/or non-volatile memory. For example, memory 520 may include a type of random access memory (RAM) such as dynamic RAM (DRAM), static RAM (SRAM), thyristor RAM (T-RAM) and/or zero-capacitor RAM (Z-RAM). Alternatively or additionally, memory 520 may include a type of read-only memory (ROM) such as mask ROM, programmable ROM (PROM), erasable programmable ROM (EPROM) and/or electrically erasable programmable ROM (EEPROM). Alternatively or additionally, memory 520 may include a type of non-volatile random-access memory (NVRAM) such as flash memory, solid-state memory, ferroelectric RAM (FeRAM), magnetoresistive RAM (MRAM) and/or phase-change memory.

In one aspect, processor 510 may be implemented in the form of one or more single-core processors, one or more multi-core processors, or one or more CISC processors. That is, even though a singular term "a processor" is used herein to refer to processor 510, processor 510 may include multiple processors in some implementations and a single processor in other implementations in accordance with the present disclosure. In another aspect, processor 510 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, processor 510 is a special-purpose machine specifically designed, arranged and configured to perform specific tasks including dynamic memory sharing in accordance with various implementations of the present disclosure.

Processor 510, as a special-purpose machine, may include non-generic and specially-designed hardware circuits that are designed, arranged and configured to perform specific tasks pertaining to improved MU-MIMO for powersave devices in accordance with various implementations of the present disclosure. In one aspect, processor 510 may execute the one or more sets of codes, programs and/or instructions 522 stored in memory 520 to perform various operations to render improved MU-MIMO for powersave devices in accordance with various implementations of the present disclosure. In another aspect, processor 510 may include a control circuit 512, a generation circuit 514 and a selection circuit 516 that, together, perform specific tasks and functions to render improved MU-MIMO for powersave devices in accordance with various implementations of the present disclosure.

The following description is applicable to implementations in which apparatus 500 functions as an access point.

In some implementations, control circuit 512 may transmit, via transceiver 530, a beacon frame to a set of wireless communication devices, with the beacon frame indicating a group identifier associated with a group of wireless communication devices of the set of wireless communication devices. Control circuit 512 may also transmit, via transceiver 530, an announcement frame to the set of wireless communication devices, with the announcement frame indicating one or more wireless communication devices of the group of wireless communication devices associated with the group identifier. Control circuit 512 may receive, via transceiver 530, a response from at least one wireless communication device of the one or more wireless communication devices associated with advertised group identifier (GroupID or GID) in MU TIM IE. Correspondingly, control circuit 512 may transmit, via transceiver 530, a MIMO (e.g., MU-MIMO or SU-MIMO) data packet to the at least one wireless communication device associated with advertised GroupID in MU TIM IE.

In some implementations, the beacon frame may include a delivery traffic indication map (DTIM) beacon frame. Alternatively or additionally, the announcement frame may include a null data packet announcement (NDPA) frame.

In some implementations, in transmitting the beacon frame, processor 510 may perform a number of operations. For instance, control circuit 512 may check powersave queues for the set of wireless communication devices. Moreover, selection circuit 516 may select the group of wireless communication devices based on data priority responsive to the checking. Furthermore, generation circuit 514 may generate the beacon frame which includes a multi-user (MU) traffic indication map (TIM) information element (IE) with the MU TIM IE having a group identification (GID) field indicating the group identifier identifying the selected group.

Alternatively or additionally, in transmitting the announcement frame, processor 510 may perform a number of other operations. For instance, control circuit 512 may determine that there are data packets available for the one or more wireless communication devices of the group of wireless communication devices. Moreover, generation circuit 514 may generate the announcement frame which includes a station information field indicating the one or more wireless communication devices for which data packets are available.

In some implementations, in receiving the response from the at least one wireless communication device of the one or more wireless communication devices, processor 510 may receive, via transceiver 530, a response containing a very high throughput (VHT) compressed beamforming feedback from at least one of the one or more wireless communication devices. After sending the NDP frame, processor 510 may perform a number of operations. For instance, control circuit 512 may receive, via transceiver 530, no response from at least another one of the one or more wireless communication devices. Additionally, control circuit 512 may determine that each of the at least another one of the one or more wireless communication devices, as a non-responsive wireless communication device, is in a sleep mode and can send a beamforming report poll frame to other wireless communication device(s) after a PIFS time interval. Additionally, control circuit 512 may refrain from sending one or more data packets to each non-responsive wireless communication device.

Alternatively, in receiving the response from the at least one wireless communication device of the one or more wireless communication devices, control circuit 512 may transmit, via transceiver 530, a beamforming report poll to a next wireless communication device after not receiving the VHT compressed beamforming feedback packet, even after a PIFS interval, from a current wireless communication device.

In some implementations, control circuit 512 may transmit, via transceiver 530, the announcement frame after transmitting one or more broadcast frames, one or more multicast frames, or a combination thereof (e.g., one or more broadcast frames and one or more multicast frames) following the transmission of the beacon frame.

The following description is applicable to implementations in which apparatus 500 functions as a mobile client or station.

In some implementations, control circuit 512 may receive, via transceiver 530, a beacon frame from an access point, with the beacon frame indicating a group identifier associated with a group of wireless communication devices of a set of wireless communication devices. Control circuit 512 may also receive, via transceiver 530, an announcement frame, with the announcement frame indicating one or more wireless communication devices of the group of wireless communication devices associated with the group identifier. Control circuit 512 may transmit, via transceiver 530, a response to the access point, and receive, via transceiver 530, a MIMO (e.g., MU-MIMO or SU-MIMO) data packet from the access point responsive to the transmitting of the response.

In some implementations, the beacon frame may include MU TIM IE in a delivery traffic indication map (DTIM) beacon frame.

In some implementations, in receiving the beacon frame, processor 510 may perform a number of operations. For instance, control circuit 512 may enter (or cause processor 510 or at least a portion of apparatus 500 to enter) into an awake mode from a sleep mode to receive the beacon frame. Control circuit 512 may also identify a MU TIM IE included in the beacon frame. The MU TIM IE may include a GID field indicating the group identifier identifying the group of wireless communication devices of the set of wireless communication devices.

In some implementations, control circuit 512 may receive, via transceiver 530, one or more broadcast frames, one or more multicast frames, or a combination thereof (e.g., one or more broadcast frames and one or more multicast frames) after receiving the beacon frame and before receiving the announcement frame.

In some implementations, in receiving the announcement frame, processor 510 may perform a number of operations. For instance, control circuit 512 may remain in the awake mode. Moreover, control circuit 512 may identify a station information field included in the announcement frame. The station information field may indicate the one or more wireless communication devices for which data packets are available. In some implementations, control circuit 512 may also determine that an associated wireless communication device (e.g., apparatus 500) is not among the one or more wireless communication devices indicated in the station information field. Moreover, control circuit 512 may enter (or cause processor 510 or at least a portion of apparatus 500 to enter) into a sleep mode from the awake mode.

In some implementations, control circuit 512 may receive, via transceiver 530, a beamforming report poll from the access point. Additionally, control circuit 512 may transmit, via transceiver 530, a VHT compressed beamforming feedback packet to the access point responsive to the receiving of the beamforming report poll.

Figure 6:
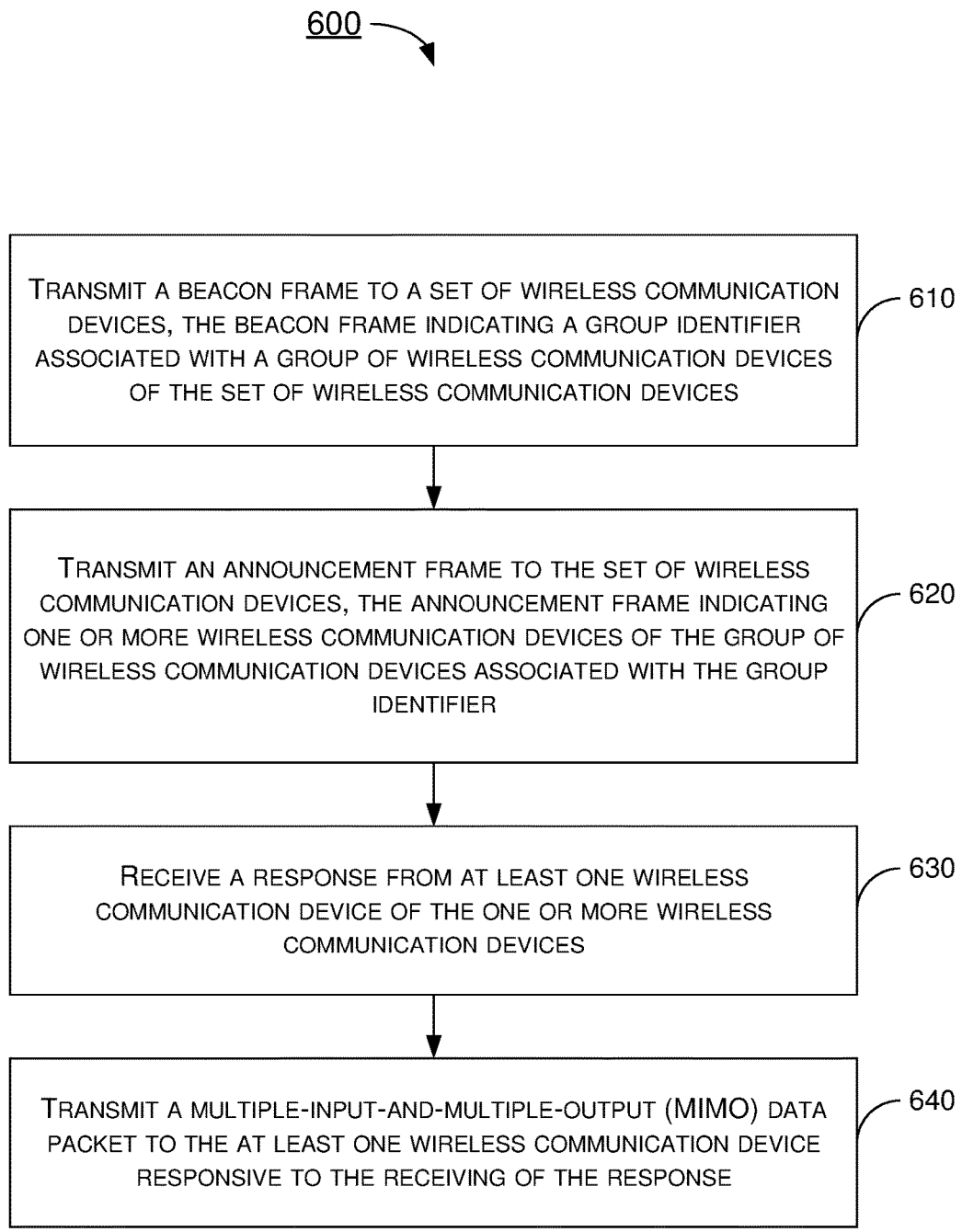
FIG. 6 is a flowchart of an example process in accordance with an implementation of the present disclosure.

FIG. 6 illustrates an example process 600 in accordance with an implementation of the present disclosure. Process 600 may represent an aspect of implementing features of apparatus 500. Process 600 may include one or more operations, actions, or functions as illustrated by one or more of blocks 610, 620, 630 and 640. Although illustrated as discrete blocks, various blocks of process 600 may be divided into additional blocks, combined into fewer blocks, or eliminated, depending on the desired implementation. Moreover, the blocks/sub-blocks of process 600 may executed in the order shown in FIG. 6 or, alternatively in a different order. Process 600 may be implemented by apparatus 500 and any variations thereof. For instance, process 600 may be implemented in or by apparatus 500 functioning as an access point. Solely for illustrative purposes, process 600 is described below in the context of apparatus 500 being an access point. Process 600 may begin at block 610.

At 610, process 600 may involve processor 510 of apparatus 500 transmitting, via transceiver 530, a beacon frame to a set of wireless communication devices. The beacon frame may indicate a group identifier associated with a group of wireless communication devices of the set of wireless communication devices. Process 600 may proceed from 610 to 620.

At 620, process 600 may involve processor 510 of apparatus 500 transmitting, via transceiver 530, an announcement frame to the set of wireless communication devices. The announcement frame may indicate one or more wireless communication devices of the group of wireless communication devices associated with the group identifier. Process 600 may proceed from 620 to 630.

At 630, process 600 may involve processor 510 of apparatus 500, via transceiver 530, sending NDP frame to first wireless communication device and receiving a response containing VHT compressed beamforming feedback from at least one wireless communication device of the one or more wireless communication devices. Process 600 may further involve processor 510 of apparatus 500, via transceiver 530, sending beamforming report poll frame to at least one other wireless communication device of the group and receiving a response containing VHT compressed beamforming feedback. Process 600 may proceed from 630 to 640.

At 640, process 600 may involve processor 510 of apparatus 500 transmitting, via transceiver 530, a MIMO (e.g., MU-MIMO or SU-MIMO) data packet to the at least one wireless communication device responsive to the receiving of the response.

In some implementations, in transmitting the beacon frame, process 600 may involve processor 510 performing a number of operations. For instance, process 600 may involve processor 510 checking powersave queues for the set of wireless communication devices. Process 600 may also involve processor 510 selecting the group of wireless communication devices based on data priority responsive to the checking. Process 600 may further involve processor 510 generating the beacon frame which includes a multi-user (MU) traffic indication map (TIM) information element (IE) with the MU TIM IE having a group identification (GID) field indicating the group identifier identifying the selected group.

In some implementations, in transmitting the announcement frame, process 600 may involve processor 510 performing a number of operations. For instance, process 600 may involve processor 510 determining that there are data packets available for the one or more wireless communication devices of the group of wireless communication devices. Moreover, process 600 may involve processor 510 generating the announcement frame which includes a station information field indicating the one or more wireless communication devices for which data packets are available.

In some implementations, in receiving the response from the at least one wireless communication device of the one or more wireless communication devices, process 600 may involve processor 510 receiving, via transceiver 530, a response containing a very high throughput (VHT) compressed beamforming feedback from at least one of the one or more wireless communication devices. Moreover, process 600 may involve processor 510 performing a number of operations. For instance, process 600 may involve processor 510 receiving no response from at least another one of the one or more wireless communication devices. Process 600 may also involve processor 510 determining that each of the at least another one of the one or more wireless communication devices, as a non-responsive wireless communication device, is in a sleep mode. Process 600 may further involve processor 510 refraining from sending one or more data packets to each non-responsive wireless communication device.

In some implementations, in receiving the response, process 600 may involve processor 510 receiving a very high throughput (VHT) compressed beamforming packet from the at least one wireless communication device of the one or more wireless communication devices. Moreover, process 600 may involve processor 510 transmitting a beamforming report poll to a next wireless communication device after not receiving the VHT compressed beamforming feedback packet from a current wireless communication device.

In some implementations, the beacon frame may include a MU TIM IE in a delivery traffic indication map (DTIM) beacon frame.

In some implementations, in transmitting the announcement frame, process 600 may involve processor 510 transmitting, via transceiver 530, the announcement frame after transmitting one or more broadcast frames, one or more multicast frames, or a combination thereof (e.g., one or more broadcast frames and one or more multicast frames) following the transmission of the beacon frame.

Figure 7:
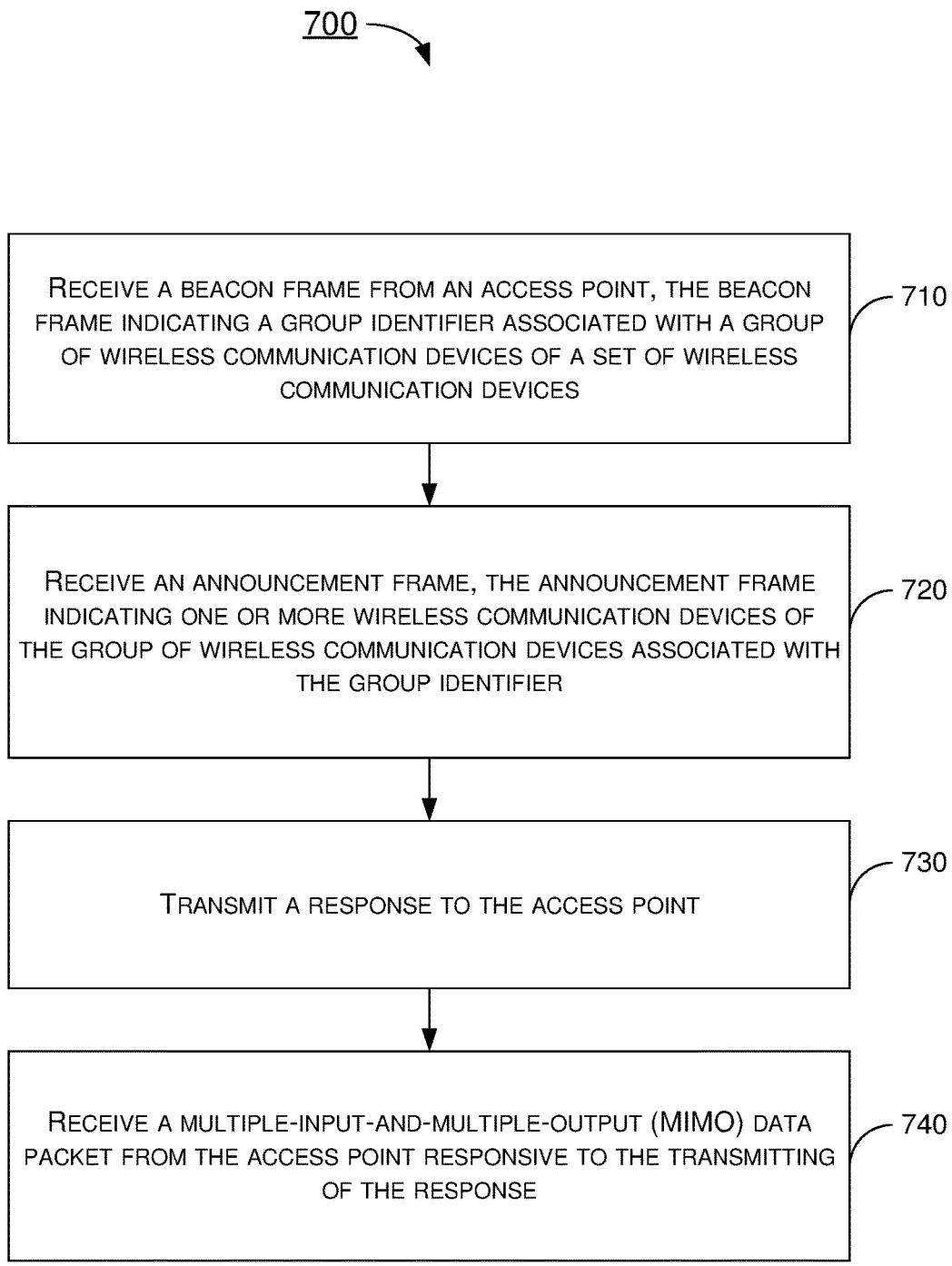
FIG. 7 is a flowchart of an example process in accordance with another implementation of the present disclosure.

FIG. 7 illustrates an example process 700 in accordance with an implementation of the present disclosure. Process 700 may represent an aspect of implementing features of apparatus 500. Process 700 may include one or more operations, actions, or functions as illustrated by one or more of blocks 710, 720, 730 and 740. Although illustrated as discrete blocks, various blocks of process 700 may be divided into additional blocks, combined into fewer blocks, or eliminated, depending on the desired implementation. Moreover, the blocks/sub-blocks of process 700 may executed in the order shown in FIG. 7 or, alternatively in a different order. Process 700 may be implemented by apparatus 500 and any variations thereof. For instance, process 700 may be implemented in or by apparatus 500 functioning as a mobile client or station (e.g., wireless communication device) in communication with an access point. Solely for illustrative purposes, process 700 is described below in the context of apparatus 500 being a mobile client. Process 700 may begin at block 710.

At 710, process 700 may involve processor 510 of apparatus 500 receiving, via transceiver 530, a beacon frame from an access point. The beacon frame may indicate a group identifier associated with a group of wireless communication devices of a set of wireless communication devices. Process 700 may proceed from 710 to 720.

At 720, process 700 may involve processor 510 of apparatus 500 receiving, via transceiver 530, an announcement frame. The announcement frame may indicate one or more wireless communication devices of the group of wireless communication devices associated with the group identifier. Process 700 may proceed from 720 to 730.

At 730, process 700 may involve processor 510 of apparatus 500 transmitting, via transceiver 530, a response containing VHT compressed beamforming feedback to the access point. Process 700 may proceed from 730 to 740.

At 740, process 700 may involve processor 510 of apparatus 500 receiving, via transceiver 530, a MIMO (e.g., MU-MIMO or SU-MIMO) data packet from the access point responsive to the transmitting of the response.

In some implementations, in receiving the beacon frame, process 700 may involve processor 510 performing a number of operations. For instance, process 700 may involve processor 510 entering into an awake mode from a sleep mode to receive the beacon frame. Moreover, process 700 may involve processor 510 identifying a MU TIM IE included in the beacon frame, which may include a GID field indicating the group identifier identifying the group of wireless communication devices of the set of wireless communication devices.

In some implementations, in receiving the announcement frame, process 700 may involve processor 510 performing a number of operations. For instance, process 700 may involve processor 510 remaining in an awake mode. Additionally, process 700 may involve processor 510 identifying a station information field included in the announcement frame. The station information field may indicate the one or more wireless communication devices for which data packets are available. In some implementations, process 700 may involve processor 510 performing additional operations. For instance, process 700 may involve processor 510 determining that an associated wireless communication device (e.g., apparatus 500 or a wireless communication device in which apparatus 500 is implemented) is not among the one or more wireless communication devices indicated in the station information field. Moreover, process 700 may involve processor 510 entering into a sleep mode from the awake mode for the associated wireless communication device.

In some implementations, in transmitting the response to the access point, process 700 may involve processor 510 performing a number of operations. For instance, process 700 may involve processor 510 receiving, via transceiver 530, a beamforming report poll from the access point. Furthermore, process 700 may involve processor 510 transmitting, via transceiver 530, a VHT compressed beamforming packet to the access point responsive to the receiving of the beamforming report poll.

In some implementations, the beacon frame may include a MU TIM IE in a delivery traffic indication map (DTIM) beacon frame.

In some implementations, process 700 may further involve processor 510 receiving, via transceiver 530, one or more broadcast frames, one or more multicast frames, or a combination thereof (e.g., one or more broadcast frames and one or more multicast frames) after receiving the beacon frame and before receiving the announcement frame.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   transmitting a beacon frame to a set of wireless communication devices, the beacon frame indicating a group identifier associated with a group of wireless communication devices of the set of wireless communication devices;
   transmitting an announcement frame to the set of wireless communication devices, the announcement frame indicating one or more wireless communication devices of the group of wireless communication devices associated with the group identifier;

receiving a response from at least one wireless communication device of the one or more wireless communication devices; and
transmitting a multiple-input-and-multiple-output (MIMO) data packet to the at least one wireless communication device responsive to the receiving of the response,
wherein the transmitting of the beacon frame comprises:
checking powersave queues for the set of wireless communication devices;
selecting the group of wireless communication devices based on data priority responsive to the checking; and
generating the beacon frame which includes a multi-user (MU) traffic indication map (TIM) information element (IE) with the MU TIM IE having a group identification (GID) field indicating the group identifier identifying the selected group.

2. The method of claim 1, wherein the transmitting of the announcement frame comprises:
determining that there are data packets available for the one or more wireless communication devices of the group of wireless communication devices; and
generating the announcement frame which includes a station information field indicating the one or more wireless communication devices for which data packets are available.

3. The method of claim 1, wherein the receiving of the response from the at least one wireless communication device of the one or more wireless communication devices comprises receiving a response containing a very high throughput (VHT) compressed beamforming feedback from at least one of the one or more wireless communication devices, and wherein the receiving further comprises:
receiving no response from at least another one of the one or more wireless communication devices;
determining that each of the at least another one of the one or more wireless communication devices, as a non-responsive wireless communication device, is in a sleep mode; and
refraining from sending one or more data packets to each non-responsive wireless communication device.

4. The method of claim 3, wherein the receiving of the response from the at least one wireless communication device of the one or more wireless communication devices comprises:
transmitting a beamforming report poll to a next wireless communication device after not receiving the VHT compressed beamforming feedback packet from a current wireless communication device.

5. The method of claim 1, wherein the beacon frame comprises the MU TIM IE in a delivery traffic indication map (DTIM) beacon frame.

6. The method of claim 1, wherein the transmitting of the announcement frame comprises transmitting the announcement frame after transmitting one or more broadcast frames, one or more multicast frames, or a combination thereof following the transmitting of the beacon frame.

7. A method, comprising:
receiving a beacon frame from an access point, the beacon frame indicating a group identifier associated with a group of wireless communication devices of a set of wireless communication devices;
receiving an announcement frame, the announcement frame indicating one or more wireless communication devices of the group of wireless communication devices associated with the group identifier;
transmitting a response to the access point; and
receiving a multiple-input-and-multiple-output (MIMO) data packet from the access point responsive to the transmitting of the response,
wherein the access point generates the beacon frame by performing operations comprising:
checking powersave queues for the set of wireless communication devices;
selecting the group of wireless communication devices based on data priority responsive to the checking; and
generating the beacon frame which includes a multi-user (MU) traffic indication map (TIM) information element (IE) with the MU TIM IE having a group identification (GID) field indicating the group identifier identifying the selected group.

8. The method of claim 7, wherein the receiving of the beacon frame comprises:
entering into an awake mode from a sleep mode to receive the beacon frame; and
identifying the MU TIM IE included in the beacon frame.

9. The method of claim 7, wherein the receiving of the announcement frame comprises:
remaining in an awake mode; and
identifying a station information field included in the announcement frame, the station information field indicating the one or more wireless communication devices for which data packets are available.

10. The method of claim 9, further comprising:
determining that an associated wireless communication device is not among the one or more wireless communication devices indicated in the station information field; and
entering into a sleep mode from the awake mode.

11. The method of claim 7, wherein the beacon frame comprises the MU TIM IE in a delivery traffic indication map (DTIM) beacon frame.

12. The method of claim 7, further comprising:
receiving one or more broadcast frames, one or more multicast frames, or a combination thereof after the receiving of the beacon frame and before the receiving of the announcement frame.

13. An apparatus, comprising:
a memory configured to store one or more sets of instructions; and
a processor coupled to access the memory to execute the one or more instructions and, upon executing the one or more sets of instructions, the processor is configured to perform operations comprising:
transmitting a beacon frame to a set of wireless communication devices, the beacon frame indicating a group identifier associated with a group of wireless communication devices of the set of wireless communication devices;
transmitting an announcement frame to the set of wireless communication devices, the announcement frame indicating one or more wireless communication devices of the group of wireless communication devices associated with the group identifier;
receiving a response from at least one wireless communication device of the one or more wireless communication devices; and
transmitting a multiple-input-and-multiple-output (MIMO) data packet to the at least one wireless communication device responsive to the receiving of the response, wherein, in transmitting the beacon frame, the processor performs operations comprising:

checking powersave queues for the set of wireless communication devices;

selecting the group of wireless communication devices based on data priority responsive to the checking; and generating the beacon frame which includes a multi-user (MU) traffic indication map (TIM) information element (IE) with the MU TIM IE having a group identification (GID) field indicating the group identifier identifying the selected group.

14. The apparatus of claim 13, wherein, in transmitting the announcement frame, the processor performs operations comprising:

determining that there are data packets available for the one or more wireless communication devices of the group of wireless communication devices; and generating the announcement frame which includes a station information field indicating the one or more wireless communication devices for which data packets are available.

15. The apparatus of claim 13, wherein, in receiving the response from the at least one wireless communication device of the one or more wireless communication devices, the processor receives a response containing a very high throughput (VHT) compressed beamforming feedback from at least one of the one or more wireless communication devices, and wherein the processor further performs operations comprising:

receiving no response from the at least another one of the one or more wireless communication devices;

determining that each of the at least another one of the one or more wireless communication devices, as a non-responsive wireless communication device, is in a sleep mode; and refraining from sending one or more data packets to each non-responsive wireless communication device.

16. The apparatus of claim 15, wherein, in receiving the response from the at last one wireless communication device of the one or more wireless communication devices, the processor performs operations comprising:

transmitting a beamforming report poll to a next wireless communication device after not receiving the VHT compressed beamforming feedback packet from a current wireless communication device.

17. The apparatus of claim 13, wherein the processor is further configured to transmit one or more broadcast frames, one or more multicast frames, or a combination thereof after the transmitting of the beacon frame and before the transmitting of the announcement frame.

18. The apparatus of claim 13, wherein the beacon frame comprises the MU TIM IE in a delivery traffic indication map (DTIM) beacon frame.

* * * * *